ary Examiner—Herbert B. Guynn

United States Patent [19]
Clampitt et al.

[11] 4,172,041
[45] Oct. 23, 1979

[54] COMPOSITION FOR ACIDIZING SUBTERRANEAN FORMATIONS

[75] Inventors: Richard L. Clampitt; James E. Hessert, both of Bartlesville, Okla.

[73] Assignee: Phillips Petroleum Company, Bartlesville, Okla.

[21] Appl. No.: 846,059

[22] Filed: Oct. 27, 1977

Related U.S. Application Data

[62] Division of Ser. No. 643,987, Dec. 24, 1975, Pat. No. 4,068,719.

[51] Int. Cl.$^2$ .............................................. E21B 43/27
[52] U.S. Cl. .............................. 252/8.55 C; 166/307; 252/8.55 R
[58] Field of Search ...................... 252/8.55 R, 8.55 C, 252/316; 166/282, 283, 307, 308

[56] References Cited

U.S. PATENT DOCUMENTS

| | | | |
|---|---|---|---|
| 3,252,904 | 5/1966 | Carpenter | 252/8.55 |
| 3,415,319 | 12/1968 | Gibson | 166/308 X |
| 3,502,149 | 3/1970 | Pence | 252/8.55 X |
| 3,727,689 | 4/1973 | Clampitt | 166/307 X |
| 3,923,666 | 12/1975 | Dill | 252/8.55 |

*Primary Examiner*—Herbert B. Guynn

[57] ABSTRACT

Gelled acidic compositions suitable for either matrix-acidizing or fracture-acidizing of subterranean formations, and methods of using said compositions, are provided. Said compositions comprise water, a water-dispersible polymer of acrylamide, an acid, a water-soluble compound of a polyvalent metal wherein the metal can be reduced to a lower polyvalent valence state and cause gelation of the water containing said polymer and said acid, and a reducing agent capable of reducing said metal and causing said gelation.

4 Claims, No Drawings

COMPOSITION FOR ACIDIZING SUBTERRANEAN FORMATIONS

This is a divisional application of application Ser. No. 643,987 filed Dec. 24, 1975, now U.S. Pat. No. 4,068,719 issued Jan. 17, 1978.

This invention relates to acid treating or acidizing of subterranean formations.

Acid treating or acidizing of porous subterranean formations penetrated by a well bore has been widely employed for increasing the production of fluids, e.g., crude oil, natural gas, etc., from said formations. The usual technique of acidizing a formation comprises introducing a non-oxidizing acid into the well under sufficient pressure to force the acid out into the formation where it reacts with the acid-soluble components of the formation. The technique is not limited to formations of high acid solubility such as limestone, dolomite, etc. The technique is also applicable to other types of formations such as a sandstone containing streaks or striations of acid-soluble components such as the various carbonates.

During the acid treating operation, passageways for fluid flow are created in the formation, or existing passageways therein are enlarged, thus stimulating the production of fluids from the formation. This action of the acid on the formation is often called etching. Acid treating or acidizing operations wherein the acid is injected into the formation at a pressure or rate insufficient to create cracks or fractures in the formation is usually referred to as matrix-acidizing.

Hydraulic fracturing is also commonly employed to increase the production of fluids from subterranean formations. Hydraulic fracturing comprises the injection of a suitable fracturing fluid down a well penetrating a formation and into said formation under sufficient pressure to overcome the pressure exerted by the overburden. This results in creating a crack or fracture in the formation to provide a passageway which facilitates flow of fluids through the formation and into the well. Combination fracture-acidizing processes are well known in the art.

Thus, it is within the scope of the present invention to inject the gelled acidic compositions of the invention into the formation under insufficient pressure to cause fracturing of the formation and carry out a matrix acidizing operation, or inject said gelled acidic composition at sufficient rates and pressure to cause fracturing and carry out a combination fracture-acidizing operation.

One of the problems commonly encountered in acidizing operations is insufficient penetration of the formation by the acid. It is desirable that good penetration be obtained in order to realize maximum benefits from the operation. Too often the acid is essentially completely spent in the area immediately adjacent and surrounding the well bore. The severity of the problem increases as the well temperature increases because acid reactivity with the formation increases with increasing temperatures, as in deeper wells.

Poor penetration can also be caused, and/or aggravated, by fluid loss to the more porous zones of the formation where low permeability is not a problem. Poor penetration can also be caused, and/or aggravated, by leak-off at the fracture faces in combination fracturing-acidizing operations. Either said fluid loss or said leak-off can frequently worsen the situation by leaving the tight (low permeability) zones of the formation unchanged and merely opening up the already high permeability zones.

One solution which has been proposed for the above discussed problem is to incorporate various polymeric thickening or viscosifying agents into the acid solution. Said agents serve to thicken the acid solution and thus increase the viscosity thereof. It has been reported that so thickened acid solutions have reduced fluid loss properties. For example, see U.S. Pat. No. 3,415,319 issued in the name of B. L. Gibson; and U.S. Pat. No. 3,434,971 issued in the name of B. L. Atkins. It has also been reported that the reaction rate of said so-thickened acid solutions with the acid-soluble portions of the formation is lessened or retarded. See, for example, U.S. Pat. No. 3,749,169 issued in the name of J. F. Tate; U.S. Pat. No. 3,236,305 issued in the name of C. F. Parks; and U.S. Pat. No. 3,252,904 issued in the name of N. F. Carpenter.

Higher viscosities are also advantageous in combination fracturing-acidizing operations in that the more viscous acidic solutions produce wider and longer fractures. More viscous acid solutions are also more effective in carrying propping agents into the formation when propping agents are used.

Another problem encountered in acidizing operations, particularly when employing acidizing compositions having thickening or viscosifying agents incorporated therein, is stability to heat. By stability to heat, it is meant the retention of the increased or greater viscosity properties under the conditions of use. Such compositions to be satisfactory should be sufficiently stable to resist degeneration by the heat of the formation for a period of time sufficient to accomplish the intended purpose, e.g., good penetration and significant etching of the formation. The degree of stability required in any particular operation will vary with such operating variables as the type of formation being treated, the temperature of the formation, the well depth (time to pump the acidic composition down the well and into the formation), the acid concentration in the composition, etc. For example, acidizing of a tight low permeability formation will proceed more slowly than a more permeable formation, other factors being the same, because a longer time will be required to obtain a significant amount of etching and the composition must remain in place and effective for a longer period of time. Also, more time will be required to pump the acidic composition into place in the formation.

The temperature of the formation usually has a pronounced effect on the stability of the acidizing compositions and, generally speaking, is one of the most important operating variables when considering stability. Increased formation temperatures usually have at least two undesirable effects. One such effect is degeneration of the composition, e.g., decrease in viscosity. Another such effect is increased rate of reaction of the acid with the formation. Thus, some compositions which would be satisfactory in a low temperature formation such as in the Hugoton field in the Anadarko basin might not be satisfactory in formations encountered in deeper wells as in some West Texas fields.

In ordinary acidizing operations using unthickened acids there is usually no problem in removing the spent acid because it is essentially water. However, a problem which is sometimes encountered when using thickened compositions in treating formations is the ease of removal of the treating composition after the operation is completed. Some thickened or highly viscous solutions are difficult to remove from the pores of the formation or the fracture after the operation is complete. Sometimes a clogging residue can be left in the pores of the formation, or in the fracture. This can inhibit the production of fluids from the formation and can require costly cleanup operations. It would be desirable to have gelled acidic compositions which break down to a lesser viscosity within a short time after the operation is completed.

The present invention provides a solution for, or at least mitigates, the above discussed problems. The present invention provides improved methods for acidizing, or fracture-acidizing, subterranean formations; and new gelled acidic compositions for use in said methods.

Thus, in accordance with one broad aspect of the concept of the invention, there is provided a method for acid treating a porous subterranean formation susceptible of attack by an acid and penetrated by a well bore, which method comprises: injecting into said formation via said well bore a gelled acidic composition comprising water; an amount of a water-dispersible polymer of acrylamide which is sufficient to thicken said water; an amount of a water-soluble compound of a polyvalent metal wherein the metal present is capable of being reduced to a lower polyvalent valence state and which is sufficient to cause gelation of an aqueous dispersion of the components of said composition when the valence of at least a portion of said metal is reduced to said lower valence state; an amount of a water-soluble reducing agent which is effective to reduce at least a portion of said metal to said lower valence state and cause said gelation; an amount of a non-oxidizing acid which is capable of reacting with a significant amount of the acid-soluble components of said formation; said polymer, said polyvalent metal compound, said reducing agent, and said acid, in the amounts used, being sufficiently compatible with each other in an aqueous dispersion thereof to permit said gelatin and thus form a said composition having sufficient stability to degeneration by the heat of said formation to permit good penetration of said composition into said formation; and maintaining said composition in said formation in contact therewith for a period of time sufficient for the acid in said composition to significantly react with the acid-soluble components of said formation and stimulate the production of fluids therefrom.

Further, in accordance with another broad aspect of the concept of the invention there is provided a gelled acidic composition, suitable for matrix acidizing or fracture-acidizing of a subterranean formation, comprising: water; a water-thickening amount of a water-dispersible polymer of acrylamide; an amount of a water-soluble compound of a polyvalent metal wherein the metal present is capable of being reduced to a lower polyvalent valence state and which is sufficient to cause gelation of an aqueous dispersion of the components of said composition when the valence of at least a portion of said metal is reduced to said lower valence state; an amount of a water-soluble reducing agent which is effective to reduce at least a portion of said metal to said lower valence state and cause said gelation; and an amount of a non-oxidizing acid which is capable of reacting with a significant amount of the acid-soluble components of said formation; said polymer, said polyvalent metal compound, said reducing agent, and said acid, in the amounts used, being sufficiently compatible with each other in an aqueous dispersion thereof to permit said gelation and thus form a said composition having sufficient stability to degeneration by the heat of said formation to permit good penetration of said composition into said formation and the maintenance of said composition in said formation in contact therewith for a period of time sufficient for the acid in said composition to significantly react with the acid-soluble components of said formation and stimulate the production of fluids therefrom.

As noted above, the gelled acidic compositions of the invention must be suitable for matrix acidizing or fracture-acidizing of subterranean formations. In order to satisfy this requirement, the polymer, the polyvalent metal compound, the reducing agent, and the acid, in the amounts used, must be sufficiently compatible with each other, in an aqueous dispersion thereof, to permit the gelation of said dispersion and thus form a said composition having sufficient stability to degeneration by the heat of the formation to permit good penetration of said composition into the formation. Furthermore, once said penetration has been attained, the said stability must be sufficient to permit the maintaining of said composition in contact with the formation for a period of time sufficient for the acid in the composition to significantly react with the acid-soluble components of the formation and stimulate the production of fluids therefrom, e.g., by creating new passageways or enlarging existing passageways through said formation.

Herein and in the claims, unless otherwise specified, the term "good penetration" means penetration of live or effective acid into the formation a sufficient distance to result in stimulating the production of fluids therefrom, e.g., by the creation of sufficient new passageways, or sufficient enlargement of existing passageways, through said formation to significantly increase the production of fluids from the formation. This can vary for different formations, well spacings, and what it is desired to accomplish in a given acidizing treatment. Those skilled in the art will usually know what will be "good penetration" for a given formation and a given type of treatment. However, generally speaking, for guidance purposes in the practice of the invention and not by way of limitation of the invention, "good penetration" will usually be considered to be a distance of a few feet, e.g., up to 5 or more, in a small volume matrix acidizing operation, and several hundred feet, e.g., up to 500 or more, in a large volume fracture-acidizing operation.

Herein and in the claims, unless otherwise specified, the term "polymer" is employed generically to include both homopolymers and copolymers; and the term "water-dispersible polymers" is employed generically to include those polymers which are truly water-soluble and those polymers which are dispersible in water or other aqueous medium to form stable colloidal suspensions which can be gelled as described herein. Also, the term "aqueous dispersion" is employed generically to include both true solutions and stable colloidal suspensions of the components of the compositions of the invention which can be gelled as described herein.

Any suitable polymer of acrylamide meeting the above stated compatibility requirements can be used in the practice of the invention. Thus, under proper conditions of use, such polymers can include various polyacrylamides and related polymers which are water-dispersible and which can be used in an aqueous medium, with the gelling agents described herein, to give an aqueous gel. These can include the various substantially linear homopolymers and copolymers of acrylamide and methacrylamide. By substantially linear it is meant that the polymers are substantially free of crosslinking between the polymer chains. Said polymers can have up to about 75, preferably up to about 45, percent of the carboxamide groups hydrolyzed to carboxyl groups. One presently preferred group of polymers includes those wherein from about 20 to about 25 percent of the carboxamide groups are hydrolyzed. As used herein and in the claims, unless otherwise specified, the term "hydrolyzed" includes modified polymers wherein the carboxyl groups are in the acid form and also such polymers wherein the carboxyl groups are in the salt form, provided said salts are water-dispersible. Such salts include the ammonium salts, the alkali metal salts, and others which are water-dispersible. Hydrolysis can be carried out in any suitable fashion, for example, by heating an aqueous solution of the polymer with a suitable amount of sodium hydroxide.

Substantially linear polyacrylamides can be prepared by methods known in the art. For example, the polymerization can be carried out in aqueous medium, in the presence of a small but effective amount of a water-soluble oxygen-containing catalyst, e.g., a thiosulfate or bisulfate of potassium or sodium or an organic hydroperoxide, at a temperature between about 30° and 80° C. The resulting polymer is recovered from the aqueous medium, as by drum drying, and can be subsequently ground to the desired particle size. The particle size should be fine enough to facilitate dispersion of the polymer in water. A presently preferred particle size is such that about 90 weight percent will pass through a number 10 mesh sieve, and not more than about 10 weight percent will be retained on a 200 mesh sieve (U.S. Bureau of Standards Sieve Series).

Under proper conditions of use, examples of copolymers which can be used in the practice of the invention can include the water-dispersible copolymers resulting from the polymerization of a major proportion of acrylamide or methacrylamide and a minor proportion of an ethylenically unsaturated monomer copolymerizable therewith. It is desirable that sufficient acrylamide or methacrylamide be present in the monomers mixture to impart to the copolymer the above-described water-dispersible properties, for example, from about 60 to 99 percent acrylamide and from about 1 to 40 percent other ethylenically unsaturated monomers, preferably from about 75 to about 95 percent acrylamide and from about 5 to about 25 percent other ethylenically unsaturated monomer. Such other monomers include acrylic acid, methacrylic acid, vinylsulfonic acid, vinylbenzylsulfonic acid, vinylbenzenesulfonic acid, vinyl acetate, acrylonitrile, methyl acrylonitrile, vinyl alkyl ether, vinyl chloride, maleic anhydride, vinyl substituted cationic quaternary ammonium compounds, and the like. Various methods are known in the art for preparing said copolymers. For example, see U.S. Pat. Nos. 2,625,529; 2,740,522; 2,729,557; 2,831,841; and 2,909,508. Said copolymers can also be used in the hydrolyzed form, as discussed above for the homopolymers.

Crosslinked polyacrylamides and crosslinked polymethacrylamides, at various stages of hydrolysis as described above, and meeting the above-stated compatibility requirements, can also be used in the practice of the invention. In general, said crosslinked polyacrylamides can be prepared by the methods described above, but including in the monomeric mixture a suitable amount of a suitable crosslinking agent. Examples of crosslinking agents can include methylenebisacrylamide, divinylbenzene, vinyl ether, divinyl ether, and the like. Said crosslinking agents can be used in small amounts, e.g., up to about 1 percent by weight of the monomeric mixture. Such crosslinking is to be distinguished from any crosslinking which occurs when solutions of polymers and the other components of the gelled acidic compositions of the invention are gelled as described herein.

All the polymers useful in the practice of the invention are characterized by high molecular weight. The molecular weight is not critical so long as the polymer has the above-described water-dispersible properties. It is preferred that the polymer have a molecular weight of at least 500,000, more preferably at least about 2,000,000. The upper limit of molecular weight is unimportant so long as the polymer is water-dispersible, and the gelled acidic composition therefrom can be pumped. Thus, it is within the scope of the invention to use polymers having molecular weights as high as 20,000,000 or higher, and meeting said conditions.

The amount of the above-described polymers used in preparing the gelled acidic compositions of the invention can vary widely depending upon the particular polymer used, the purity of said polymer, and properties desired in said compositions. In general, the amount of polymer used will be a water-thickening amount, i.e., at least an amount which will significantly thicken the water to which it is added. For example, amounts in the order of 25 to 100 parts per million by weight (0.0025 to 0.01 weight percent) have been found to significantly thicken water. Distilled water containing 25 ppm of a polymer of acrylamide having a molecular weight of about $10 \times 10^6$ had a viscosity increase of about 41 percent. At 50 ppm the viscosity increase was about 106 percent. At 100 ppm the viscosity increase was about 347 percent. As another example, distilled water containing 25 ppm of a polymer of acrylamide having a molecular weight of about $3.5 \times 10^6$ had a viscosity increase of about 23 percent. At 50 ppm the viscosity increase was about 82 percent. At 100 ppm the viscosity increase was about 241 percent. Generally speaking, amounts of the above-described polymers in the range of from 0.01 to 4, preferably from 0.1 to 1.5, more preferably 0.1 to 0.5, weight percent, based on the total weight of the composition, can be used in preparing gelled acidic compositions for use in the practice of the invention. However, amounts outside said ranges can be used. In general, with the proper amounts of polyvalent metal and reducing agent, the amount of polymer used will determine the consistency of the gel obtained. Small amounts of polymer will usually produce liquid mobile gels which can be readily pumped. Large amounts of polymer will usually produce thicker, more viscous, somewhat elastic gels.

Metal compounds which can be used in the practice of the invention are water-soluble compounds of polyvalent metals wherein the metal is present in a valence state which is capable of being reduced to a lower polyvalent valence state, and which will meet the above-stated compatibility requirements. Thus, under proper conditions of use, examples of such compounds can include potassium permanganate, sodium permanganate, ammonium chromate, ammonium dichromate, the alkali metal chromates, the alkali metal dichromates, and chromium trioxide. Sodium dichromate and potassium dichromate, because of low cost and ready availability, are the presently preferred metal-containing compounds. The hexavalent chromium in said chromium compounds is reduced in situ to trivalent chromium by suitable reducing agents, as discussed hereinafter. In the permanganate compounds the manganese is reduced from +7 valence to +4 valence as in $MnO_2$.

The amount of said metal-containing compounds used will be a small but finite amount which is effective or sufficient to cause gelation of an aqueous dispersion of the starting components of the compositions of the invention when the metal in the polyvalent metal compound is reduced to a lower polyvalent valence state. The lower limit of the concentration of the starting metal-containing compound will depend upon several factors including the particular type of polymer used, the concentration of the polymer, and the type of gel product desired. For similar reasons, the upper limit on the concentration of the starting metal-containing compound also cannot always be precisely defined. However, it should be noted that excessive amounts of the starting metal compound, for example +6 chromium, which can lead to excessive amounts of +3 chromium when there is sufficient reducing agent present to reduce the excess +6 chromium, can adversely affect the stability of the gelled compositions. It is believed this can provide one valuable method for controlling stability or life span so as to obtain gelled acidic compositions which will break down with time and/or temperature to permit ready well clean-up subsequent to an acidizing fracturing-acidizing operation. As a general guide, the amount of the starting polyvalent metal-containing compound used in preparing the gelled acidic compositions of the invention will be in the range of from 0.05 to 30, preferably 0.5 to 20, weight percent of the amount of the polymer used. However, in some situations it may be desirable to use amounts of the starting polyvalent metal-containing compound which are outside the above ranges. Such use is within the scope of the invention. Those skilled in the art can determine the amount of starting polyvalent metal-containing compound to be used by suitable experiments carried out in the light of this disclosure.

Suitable water-soluble reducing agents which can be used in the practice of the invention are those meeting the above-stated compatibility requirements. Under proper conditions of use this can include sulfur-containing compounds such as sodium sulfite, potassium sulfite, sodium hydrosulfite, potassium hydrosulfite, sodium metabisulfite, potassium metabisulfite, sodium bisulfite, potassium bisulfite, sodium sulfide, potassium sulfide, sodium thiosulfate, potassium thiosulfate, ferrous sulfate, thioacetamide, hydrogen sulfide, and others; and nonsulfur-containing compounds such as hydroquinone, ferrous chloride, p-hydrazinobenzoic acid, hydrazine phosphite, hydrazine dichloride, and others. Some of the above reducing agents act more quickly than others. For example, sodium bisulfite has been found to cause extremely rapid gelation with the higher concentrations of polymer.

One presently preferred group of reducing agents are the water-soluble organic compounds containing from 1 to about 10 carbon atoms per molecule and which release hydrogen sulfide upon hydrolysis. These compounds contain the group =C=S and include organic amides, xanthate salts, trithiocarbonate salts, and dithiocarbamate salts. Some examples are: thioacetamide, thiourea, thioformamide, thiopropionamide, sodium ethyl xanthate, N,N-diethyl sodium dithiocarbamate, sodium butyltrithiocarbonate, and the like. Mixtures of said reducing agents can also be used.

The amount of reducing agent to be used in preparing the gelled acidic compositions of the invention will be a small but finite amount which is effective or sufficient to reduce at least a portion of the higher valence metal in the starting polyvalent metal-containing compound to a lower polyvalent valence state. Thus, the amount of reducing agent to be used depends, to some extent at least, upon the amount of the starting polyvalent metal-containing compound which is used. In many instances, it will be preferred to use an excess of reducing agent to compensate for dissolved oxygen in the water, exposure to air during preparation of the gels, and possible contact with other oxidizing substances such as might be encountered in field operations. As a general guide, the amount of reducing agent used will generally be within the range of from 0.1 to at least 150, preferably at least about 200, weight percent of the stoichiometric amount required to reduce the metal in the starting polyvalent metal compound to said lower polyvalent valence state, e.g., +6 Cr to +3 Cr. In most instances, it will be preferred to use at least a stoichiometric amount. However, in some instances, it may be desirable to use amounts of reducing agent outside said ranges. The use of such amounts is within the scope of the invention. Those skilled in the art can determine the amount of reducing agent to be used by suitable simple experiments carried out in the light of this disclosure.

Acids useful in the practice of the invention include any non-oxidizing acid meeting the above-stated compatibility requirements and which is effective in increasing the flow of fluids, e.g. hydrocarbons, through the formation and into the well. Thus, under proper conditions of use, examples of such acids can include inorganic acids such as hydrochloric acid and sulfuric acid; $C_1$–$C_3$ organic acids such as formic acid, acetic acid, propionic acid, and mixtures thereof, and combinations of inorganic and organic acids. The concentration or strength of the acid can vary depending upon the type of acid, the type of formation being treated, the above-stated compatibility requirements, and the results desired in the particular treating operation. The concentration can vary from about 1 to about 60 weight percent, with concentrations within the range of 5 to 50 weight percent usually preferred, based upon the total weight of the gelled acidic composition. When an inorganic acid such as hydrochloric acid is used it is presently preferred to use an amount which is sufficient to provide an amount of HCl within the range of from 1 to 12, more preferably up to about 10, weight percent based on the total weight of the composition. The acids used in the practice of the invention can contain any of the known corrosion inhibitors, deemulsifying agents, sequestering agents, surfactants, friction reducers, etc., known in the art, and which meet the above-stated compatibility requirements.

The gelled acidic compositions of the invention are aqueous compositions. They normally contain a significant amount of water. The amount of said water can vary widely depending upon the concentrations of the other components in the compositions, particularly the concentration of the acid. For example, when an organic acid such as acetic acid is used in the maximum concentration of 60 weight percent the amount of water present in the composition clearly will be less than when an inorganic acid such as HCl is used in the preferred maximum concentration of about 10 weight percent. Thus, while no precise overall range of water content can be set forth, based on the above-stated overall ranges for the concentrations of said other components the water content of said compositions can be in the range of from about 5 to about 99, frequently about 50 to about 95, weight percent. However, amounts of water outside said ranges can be used.

Propping agents can be included in the gelled acidic compositions of the invention if desired. Propping agents which can be used include any of those known in the art, e.g., sand grains, walnut shell fragments, tempered glass beads, aluminum pellets, and similar materials, so long as they meet the above-stated compatibility requirements. Generally speaking, it is desirable to use propping agents having particle sizes in the range of 8 to 40 mesh (U.S. Sieve Series). However, particle sizes outside this range can be employed. When propping agents are used they should be made of materials which are not severely attacked by the acid used during the time they are exposed to said acid.

Any suitable method can be employed for preparing the gelled acidic compositions of the invention. Thus, any suitable mixing technique or order of addition of the components of said composition to each other can be employed which will provide a said composition having sufficient stability to degeneration by the heat of the formation (in which the composition is to be used) to permit good penetration of the composition into, and significant etching of, said formation. However, it is ordinarily preferred to first dissolve or disperse the polymer in water before contacting the polymer with acid. Thus, it is preferred to avoid contacting the dry polymer with aqueous acid. Some suitable mixing orders, with the components named in order of mixing, include: water—polymer—polyvalent metal compound—reducing agent—acid; water—polymer—acid—polyvalent metal compound—reducing agent; and water—polymer—polyvalent metal compound—acid—reducing agent; and the like. It is within the scope of the invention to moisten or slurry the polymer with a small amount, e.g., about 1 to about 6 weight percent based on the weight of the polymer, of a low molecular weight alcohol, e.g., $C_1$ to $C_3$ alcohols, as a dispersion aid, prior to dispersing the polymer in water. Contact of the polyvalent metal compound and reducing agent in the absence of the dispersed polymer should be avoided. Since the acid may sometimes have a degrading effect on the polymer, it is preferred that the acid not be in contact with the polymer, even in aqueous solution, unduly long in the absence of the gelling agents. Similarly, it is preferred that there be no undue delay between completing the preparation of the gelled acidic composition and its introduction into contact with the formation.

As used herein and in the claims, unless otherwise specified, the stated values for "degree of hydrolysis" or "percent hydrolyzed," and like terms, refer to initial values prior to use or test of the polymer. Unless otherwise stated, said values are obtained by the following analytical procedure. Place 200 ml of distilled water in a beaker provided with a magnetic stirrer. Weigh a 0.1 gram polymer sample accurately to ±0.1 mg. Start the stirrer and quantitatively transfer the weighed sample into the water vortex. Stir at a rapid rate overnight. Using a pH meter and 1:1 HCl, adjust the pH of the sample solution to less than 3.0. Stir the solution for 30 minutes. Adjust the pH of the solution to exactly 3.3 by dropwise addition of 0.1 N NaOH. Then slowly titrate with standard 0.1 NaOH from pH 3.3 to pH 7.0.

$$\% \text{ Hydrolysis} = \frac{V \times N \times 0.072 \times 100}{W}$$

where: V = ml of base used in titration; N = normality of base; W = grams of polymer sample; and 0.072 = milliequivalent weight of acrylic acid.

The gelled acidic compositions of the invention can be prepared on the surface in a suitable tank equipped with suitable mixing means, and then pumped down the well and into the formation employing conventional equipment for pumping acidic compositions. However, it is within the scope of the invention to prepare said compositions while they are being pumped down the well. This technique is sometimes referred to as "on the fly." For example, a solution of the polymer in water can be prepared in a tank adjacent the well head. Pumping of this solution through a conduit to the well head can then be started. Then, a few feet downstream from the tank a suitable connection can be provided for introducing the polyvalent metal compound into said conduit, either dry through a mixing hopper, or preferably as an aqueous solution. Then, a few feet farther downstream the reducing agent can be similarly introduced, preferably as an aqueous solution. The acid can then be introduced into said conduit a few feet downstream from the reducing agent. As will be understood by those skilled in the art, the rate of introduction of said components into said conduit will depend upon the pumping rate of the polymer solution through said conduit. Any of the above-mentioned orders of addition can be employed in said "on the fly" technique. Mixing orifices can be provided in said conduit, if desired.

It is within the scope of the invention to precede the injection of the gelled acidic composition into the well and out into the formation with a preflush of a suitable cooling fluid, e.g., water. Such fluids serve to cool the well tubing and formation and extend the useful operating temperature range of said compositions. The volume of said cooling fluid so injected can be any suitable volume sufficient to significantly decrease the temperature of the formation being treated, and can vary depending upon the characteristics of the formation. For example, amounts up to 20,000 gallons, or more, can be used to obtain a temperature decrease in the order of 100° to 250° F.

The following examples will serve to further illustrate the invention, but should not be considered as unduly limiting on the invention.

EXAMPLE I

A 15 g quantity of an acrylamide polymer (Dow Pusher 700) having a molecular weight of about 5,500,000 and a degree of hydrolysis of about 23.5% was blended into 500 ml of tap water with the aid of a high speed mixer (Hamilton Beach malt mixer) for one minute. After standing at room temperature for 5 days, a 100 ml portion of this 3 weight percent polymer solution was transferred to a pint jar. To this was added 2.5 ml of a 10 weight percent solution of sodium dichromate dihydrate with stirring followed by the addition of 0.3 g thioacetamide. About 1 minute layer, 100 ml glacial acetic acid was added and the mixture was stirred for 1 minute more. All the reagents and acid blended quite well.

A portion of this composition (50% acetic acid, 1.5% polymer, 1250 ppm $Na_2Cr_2O_7 \cdot 2H_2O$, 1500 ppm thioacetamide, by weight) was transferred to a capillary viscometer (Kimax No. 500) and the viscometer was placed in a water bath at about 85° F. The temperature of the bath was then increased at a rate sufficient to reach 200° F. in about 1 hour. The efflux time of the composition was measured at intervals and recorded along with the time and temperature.

For purposes of comparison, another similar composition was prepared similarly, but omitting the dichromate and thioacetamide crosslinking agents. The essential conditions and results of these rests are shown in Table I below.

TABLE I

| | Gelled | | Non-Gelled | |
|---|---|---|---|---|
| Time in Bath (min) | Bath Temp. (°F.) | Efflux Time (sec) | Bath Temp. (°F.) | Efflux Time (sec) |
| 0 | 83 | 59.2 | 81 | 71.0 |
| 5 | 88 | 63.7 | 87 | 42.0 |
| 10 | 98 | 63.5 | 101 | 35.0 |
| 15 | 110 | 69.0 | 115 | 31.0 |
| 20 | 123 | 82.2 | 127 | 27.4 |
| 25 | 139 | 92.5 | 139 | 22.5 |
| 30 | 149 | 85 | 151 | 21.0 |
| 35 | 161 | 77.8 | 162 | 20.8 |
| 40 | 172 | 68.0 | 171 | 18.1 |
| 45 | 179 | 61.6 | 180 | 16.4 |
| 50 | 185 | 38.7 | 185 | 15.1 |
| 55 | 191 | 36.8 | 191 | 14.3 |
| 60 | 194 | 27.3 | 195 | 12.6 |
| 65 | 198 | 26.0 | 201 | 12.0 |
| 70 | 201 | 40.9 | — | — |

The data in Table I show that, with increasing time and increasing temperature, the non-gelled acid system exhibited a relatively low viscosity (short efflux time) which continuously decreased throughout the test period. In constrast, the gelled acid system of the invention exhibited a significantly greater viscosity (longer efflux time) throughout the test period. Moreover, the viscosity was seen to increase up to about 139° F. at which point the material appeared to gel. The composition also appeared to re-gel at 201° F. as evidenced by an increase in viscosity.

It should be noted that both compositions were more viscous than water even at the completion of the test. For comparison, pure water would exhibit an efflux time of one second or less with the viscometer used above.

Based on the above data, it is concluded that the gelled acidic composition comprising a solution of a substantially linear polyacrylamide having a degree of hydrolysis of about 23.5% and having incorporated therein sodium dichromate dihydrate, thioacetamide reducing agent, and acetic acid is a preferred composition in accordance with the invention. From the above viscosity data it is concluded that because of its greater viscosity the gelled composition of the invention would be markedly superior to the ungelled composition, particularly in fracture-acidizing operations. From said viscosity data, it is further concluded that the components of the gelled composition have sufficient compatibility with each other to permit good penetration (as defined above) into the formation, and permit maintaining of the composition in contact with the formation for a period of time usually sufficient for the acid to significantly react with the acid-soluble components of the formation. Thus, it is further concluded that suitable compositions in accordance with the invention could be advantageously for acidizing operations in wells having a depth of up to at least 10,000 feet, and at formation temperatures of up to at least 200° F. The use of a preflush cooling fluid injected down the well and into the formation prior to the injection of the gelled acidic composition would extend said ranges of operation. As will be understood by those skilled in the art, the actual attainable ranges of effective acidizing operation will depend upon the viscosity of the gelled composition, the formation temperature, the composition of the formation, the rate of injection of the gelled acidic composition, the acid concentration in said gelled acidic composition, etc.

While certain embodiments of the invention have been described for illustrative purposes, the invention is not limited thereto. Various other modifications or embodiments of the invention will be apparent to those skilled in the art in view of this disclosure. Such modifications or embodiments are within the spirit and scope of the disclosure.

We claim:

1. A gelled acidic composition, suitable for matrix-acidizing or fracture-acidizing of a subterranean formation, comprising:

water;

a water-thickening amount of a water-dispersible polymer of acrylamide;

an amount of a water-soluble compound of a polyvalent metal wherein the metal present is capable of being reduced to a lower polyvalent valence state and which is sufficient to cause gelation of an aqueous dispersion of the components of said composition when the valence of at least a portion of said metal is reduced to said lower valence state, said compound being selected from the group consisting of potassium permanganate, sodium permanganate, ammonium chromate, ammonium dichromate, the alkali metal chromates, the alkali metal dichromates and chromium trioxide;

an amount of a water-soluble reducing agent which is effective to reduce at least a portion of said metal to said lower valence state and cause said gelation; and an amount within the range of from 1 to 12 weight percent of said composition of a non-oxidizing acid which is capable of reacting with a significant amount of the acid-soluble components of said formation, said non-oxidizing acid being selected from the group consisting of hydrochloric acid, sulfuric acid and mixtures thereof;

said polymer, said polyvalent metal compound, said reducing agent, and said acid, in the amounts used, being sufficiently compatible with each other in an aqueous dispersion thereof to permit said gelation and thus form a said composition having sufficient stability to degeneration by the heat of said formation to permit good penetration of said composition into said formation and the maintenance of said composition in said formation in contact therewith for a period of time sufficient for the acid in said composition to significantly react with the acid-soluble components of said formation and stimulate the production of hydrocarbons therefrom.

2. A composition according to claim 1 wherein:

the amount of said polymer is within the range of from 0.01 to about 4 weight percent based upon the total weight of said composition;

the amount of said polyvalent metal compound is within the range of from 0.05 to 30 weight percent based upon the weight of said polymer; and the amount of said reducing agent is within the range of from 0.1 to about 200 percent of the stoichiometric amount required to reduce said polyvalent metal to said lower valence state.

3. A composition according to claim 1 wherein said polymer is a polyacrylamide.

4. A composition according to claim 2 wherein:
said polymer is a polyacrylamide having a molecular weight of at least about 2 million and wherein from about 20 to about 25 percent of the amide groups therein have been hydrolyzed to carboxyl groups.

* * * * *